United States Patent [19]

Pohjola

[11] 4,046,429

[45] Sept. 6, 1977

[54] STEERING MECHANISM FOR ENDLESS TRACK VEHICLES

[76] Inventor: Jorma Toivo Tapani Pohjola, Haravatie 6, 90530 Oulu 53, Finland

[21] Appl. No.: 628,773

[22] Filed: Nov. 4, 1975

Related U.S. Application Data

[62] Division of Ser. No. 438,191, Jan. 31, 1974, Pat. No. 3,934,664.

[30] Foreign Application Priority Data

| Feb. 1, 1973 | Finland | 292/73 |
| Jan. 7, 1974 | Finland | 40/74 |
| Feb. 1, 1973 | Finland | 293/73 |

[51] Int. Cl.² .......................................... B62D 55/24
[52] U.S. Cl. .......................................... 305/35 EB
[58] Field of Search ........... 305/44, 35 EB, 38, 29, 305/37, 41; 180/9.44

[56] References Cited

U.S. PATENT DOCUMENTS

| 3,550,967 | 12/1970 | Caron | 305/35 EB X |
| 3,582,154 | 6/1971 | Russ | 305/38 X |
| 3,637,266 | 1/1972 | Busse | 305/35 EB |
| 3,639,012 | 2/1972 | Cushman | 305/35 EB |
| 3,747,994 | 7/1973 | Russ | 305/35 EB |

*Primary Examiner*—Robert B. Reeves
*Assistant Examiner*—John P. Shannon
*Attorney, Agent, or Firm*—Steinberg & Blake

[57] ABSTRACT

A vehicle which has a pair of end rolls and an endless track guided around the end rolls is provided at its endless track with a central substantially non-stretchable region cooperating with the endless track structure to render the latter substantially rigid at the ends of the track which extend around the end rolls to prevent any slipping of the track with respect to the end rolls particularly when at least one of the end rolls is swung about an upright axis to enable the vehicle to execute a turn. On opposite sides of its central endless region the endless track has a pair of opposed lateral regions capable of automatically expanding and contracting when the vehicle executes so that the inside lateral region contracts while the outside lateral region expands during a turn, and the manner of contraction and expansion of these lateral regions of the endless track is such that together with a curving of the central non-stretchable region the endless track assumes a smooth, substantially uniform curved configuration when the vehicle executes turns.

9 Claims, 33 Drawing Figures

STEERING MECHANISM FOR ENDLESS TRACK VEHICLES

CROSS REFERENCE TO RELATED APPLICATION

This application is a division of copending application Ser. No. 438,191, filed Jan. 31, 1974, now U.S. Pat. No. 3,934,664.

BACKGROUND OF THE INVENTION

The present invention relates to vehicles.

In particular, the present invention relates to vehicles which are propelled by way of at least one endless track guided around a pair of end rolls.

In particular, the present invention relates to structure of endless tracks of the above type which enable the vehicle to execute turns. Thus, when the vehicle executes a turn one side of the endless track contracts while the other side expands enabling the track to assume a curvature corresponding to the turning of the vehicle.

In general while vehicles of the above type where an endless track is guided around a pair of end rolls, if the vehicle should turn to the right, for example, then the right ends of the end rolls approach each other while the left ends are displaced farther apart from each other, and the endless track must contract along its right side and expand along its left side when the vehicle executes such a turn to the right. Of course the opposite operations take place when the vehicle executes a turn toward the left in that at this time the left side of the endless track will contract and the right side thereof will expand.

Experience has shown that when steering a vehicle in the above manner, although a numbr of substantial advantages are achieved, it is important to provide the endless track with special properties creating special problems in the construction of the endless track.

It is to be understood that the endless track of the invention can form the only track of a vehicle or can be combined with additional tracks which are arranged one beside the other and/or consecutively.

Attempts have already been made to provide constructions of the above general type where the endless track will not slip with respect to the end rolls or the equivalent of the latter. For example in U.S. Pat. No. 3,565,198 there is shown a construction where sprocket wheels are provided to form a construction similar to end rolls around which an endless track is guided, with these sprocket wheels having teeth which are received in mating openings of the endless track elements to prevent slippage between the track and the end rolls. However, there is nothing in the latter patent to indicate the significance of this feature, and it has been found from experience that a construction where sprocket wheels extend into openings of track elements has inherent problems which do not provide the possibility of preventing slipping with substantially cylindrical end rolls which are highly desirable.

As the endless track of a vehicle of the above type travels onto a swinging end roll, with the latter being swung in order to steer the vehicle, the endless track necessarily assumes an oblique position resulting from the fact that one side of the endless track slips while the other side has a good grip or engagement on the end roll, while in the case of partial turns of relatively large radius there is a tendency of the tension and traction forces of the endless track to straighten the track at a part thereof which extends between a lateral steadying wheel and the end roll, so that for this latter reason also the endless track tends to arrive in an oblique condition onto the end roll. These latter operations result in a number of undesirable effects which include an undesirable increase in the turning radius, imposing a high stress on the endless track and preventing a relatively high speed of travel when executing turns. As a result of the above undesirable effects, an endless track such as one which is made of rubber will acquire objectionable "bagging" portions during execution of turns, which is to say portions of the track will ripple and become undesirably corrugated, preventing the load from being uniformly distributed and preventing the vehicle from carrying out smooth turns at relatively high speeds.

Thus, when a vehicle of the above general type executes a turn which is larger than that provided at the minimum radius of curvature of the endless track, the track necessarily encounters a tendency to contract at its side which is directed toward the center of the turn and a tendency to expand at the opposite side, providing inside contractions and outside dilations while the remainder of the track remains substantially straight. As a result when executing a fairly wide turn at a relatively high speed the several elements of the track strike against each other as well as against the lateral supports for the endless track, and the result is creation of impacts which must be absorbed by the remainder of the track structure such as a structure for limiting the extent to which the length of the track can increase. In addition when executing turns as a result of the above actions there is a lateral dragging force at the lateral supports for the track.

Moreover, with known constructions reliance is made on the end rolls rather than the track to achieve the desired results.

SUMMARY OF THE INVENTION

It is accordingly a primary object of the present invention to provide a vehicle of the above general type which will avoid the above drawbacks.

Thus, it is an object of the present invention to provide a vehicle of the above type with an endless track structure which in itself will enable the endless track to have a non-slip engagement with end rolls which can be of a substantially cylindrical configuration.

In addition it is an object of the present invention to provide an endless track construction which is capable of expanding and contracting at its opposed lateral regions in such a way that the entire track can curve in a smooth uniform manner when the vehicle executes turns so as to make it possible for the vehicle to curve along relatively large radii in a manner which will avoid undesirable impacts while achieving a smooth stable operation which will permit the vehicle to travel at a relatively high speed when executing a turn.

In addition it is an object of the present invention to provide an endless track structure of the above general type which is simple and rugged so that at a relatively low cost it is possible to provide an endless track structure of a long maintenance-free operating life at relatively low cost.

Moreover, it is an object of the invention to achieve the desired results by the track construction rather than by the end roll structure.

According to the invention the endless track means has an elongated endless central region which is substantially non-stretchable and which cooperates with the remainder of the endless track means to render the latter substantially rigid with respect to the end rolls at the portions of the endless track means which at any given instant extend around the end rolls to achieve a non-slip engagement with the end rolls even when executing turns in response to swinging of one of the end rolls about an upright axis. Furthermore, in accordance with the invention, the endless track means has on each side of the substantially non-stretchable central endless region a pair of lateral regions capable of automatically contracting at the inside of the turn and expanding at the outside of a turn, while the central region curves, to provide the endless track means with a smooth substantially uniform curvature enabling stable turns to be executed at relatively high speed with a minimum of stress at the track means itself as well as at the remaining components of the vehicle. The desired operation of the track is achieved by the track structure itself, rather than by the end roll structure.

BRIEF DESCRIPTION OF DRAWINGS

The invention is illustrated by way of example in the accompanying drawings which form part of this application and in which:

FIG. 9a shows track elements similar to those of FIG. 6 having a different structure situated between the track elements to eliminate the necessity for the lateral length-limiting bands by providing inserts situated between the track elements;

FIG. 9b is an end view of the structure of FIG. 9a as seen from the right of FIG. 9a;

DESCRIPTION OF PREFERRED EMBODIMENTS

Figure 1:
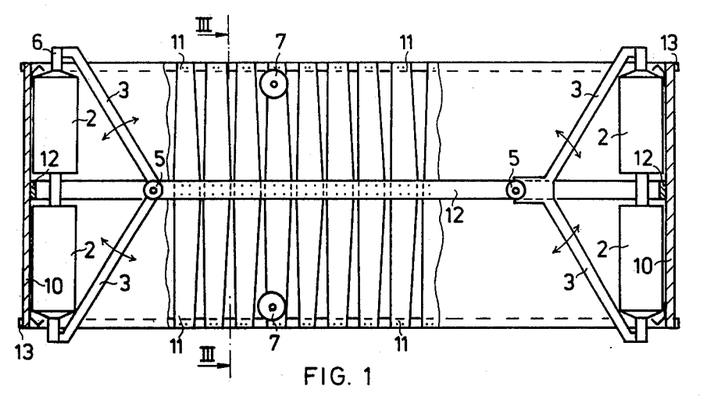
FIG. 1 is a schematic partly sectional plan view of a vehicle according to the invention, FIG. 1 showing the swingable end rolls and track means cooperating therewith in a top plan view.
Figure 3:
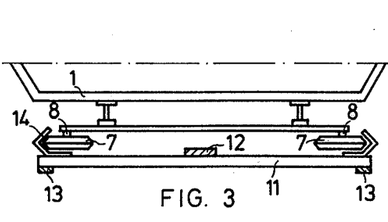
FIG. 3 is a fragmentary schematic illustration taken along line III—III of FIG. 1 in the direction of the arrows and showing how steadying wheels cooperate with lateral regions of the endless track means.

Referring first to FIGS. 1 and 3, there is schematically illustrated a chasis 1 (FIG. 3) which carries pivots 5 which extend vertically to form upright swinging axes for front and rear frame parts 3 which are pivotally supported by the pivots 5 which are fixed to the chassis 1. These parts 3 terminate in their outer ends in supports for front and rear shafts 6 on which a pair of end roll means 2 are supported for rotary movement about the axes of the horizontal shafts 6. These shafts as well as the pair of end roll means 2 extend transversely of the vehicle. Steering of the vehicle is brought about by swinging in a known way which does not form part of the present invention either one or both of the frames 3, and the shafts 6 and end roll means 2 therewith about the upright axis defined by each pivot 5. In this way it will be seen that along that part of the vehicle which is located at the inside of a turn the ends of the pair of end rolls 2 will approach each other while along the side of the vehicle which is located at the outside of a turn the ends of the end rolls 2 will move apart from each other.

An endless track means 10 which is schematically illustrated in FIG. 1 extends around and between the pair of end rolls 2 in order to be guided by the latter. Although a single endless track means 10 is illustrated extending longitudinally of the vehicle and transversely across substantially the entire width thereof, it is to be understood that the invention is equally applicable to arrangements where a plurality of endless track means are arranged either beside each other or consecutively with respect to the direction of travel of the vehicle.

It will be understood that the chassis 1 has an upper platform or the like for carrying a load as well as the operator of the vehicle, and beneath this upper platform the chassis 1 has a lower horizontal frame connected by suitable uprights to the upper platform with these uprights defining between themselves a space through which the upper run of the endless track means 10 can freely travel in the space defined between the upper and lower platforms of the chassis. In this way the lower platform or frame of the chassis 1 will carry the pivots 5 while the upper run of the endless track means 10 can pass freely through the space between the upper and lower platforms as well as through the space between the upright chassis members which connect the lower platform to the upper platform.

In the example illustrated in FIGS. 1-5, the endless track means 10 is composed of a plurality of elongated transversely extending track elements 11. These track elements 11 which extend transversely with respect to the direction of travel of the vehicle are in the form of plates, for example, made of any suitable metal, for example, and having relatively wide central regions while tapering in opposite directions from their central regions so that the several track elements 11 have their narrowest portions at their opposed outer ends. As a result of this construction the space between successive track elements 11 becomes gradually wider in a direction from the center toward a side region of the track means 10, enabling the elements 11 freely to approach each other when the track means 10 curves during execution of a turn, these track elements 11 freely approaching each other at the inside of the turn while being free to move apart from each other at the outside of the turn.

Figure 4:
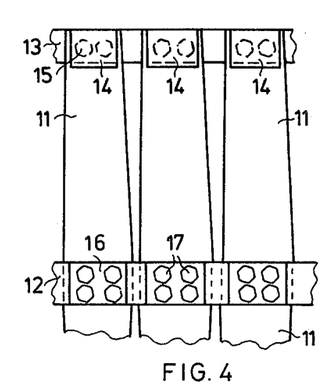
FIG. 4 is a fragmentary top plan view of an endless track means of the invention, illustrating length-limiting means at central and lateral regions of the endless track means.
Figure 5:
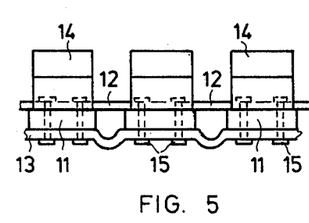
FIG. 5 is a fragmentary side elevation of the endless track structure of FIG. 4.

The endless track means 10 of the invention furthermore includes a central length-limiting means 12 in the form of an endless flexible band of steel or the like, and the central widest portions of the transversely extending track elements 11 are fixed directly to the length-limiting central band 12 in any suitable way as by the illustrated bolts 17. Thus the central regions of the successive track elements 11 are fixed to the central endless band 12. While the central band 12 of the endless track means 10 is flexible in a vertical plane it is substantially unstretchable, so that while the length of the endless track means 10 will become shorter at the inside of a turn and longer at the outside of a turn the average length of the track means determined by the length of the cental band 12 will remain substantially unchanged. Because the band 12 is flexible in a vertical plane it can curve freely around the pair of opposed end roll means 2 so as to have a curvature determined by these end rolls. It will be noted that in fact each of the end roll means 2 includes a pair of end roll components defining between themselves a space which receives the band 12 while the track elements 11 directly engage the outer surfaces of the components of the end roll means 2. Thus the diameter of the end roll means 2 at the portions thereof which directly engage the track elements 11 is greater than the diameter which receives the central band 12. While the central band 12 is laterally of a considerably greater rigidity than in the vertical direction it nevertheless is capable of curving in accordance with the turning radius of the vehicle when the latter executes a turn. As a result the central band 12 will curve uniformly in accordance with the turning radius of the vehicle, and by properly selecting the lateral rigidity of the central band the latter will contribute to the prevention of non-uniformity in the distribution of the contraction of the elongated track means 10 at the inside of a turn so as to avoid any "bagging" tendency on the end rolls 2, an effect which is particularly encountered with conventional constructions at partial turns of relatively large radius, particularly when the track elements are not braced against each other as they are when the vehicle turns along its minimum turning radius. Thus in accordance with one of the important features of the present invention the elongated track means 10 is substantially rigid with the pair of opposed end roll means 2 so as to have no possibility of slipping therewith to avoid the above "bagging", as well as to avoid gathering together of the track elements 11 one upon the other. In accordance with one of the features of the present invention a number of different solutions are provided for stiffening the endless track means on the pair of opposed end roll means 2 so as to form a rigid entity therewith according to which no slippage will take place.

For the purpose of laterally guiding and steadying the endless track means 10 there are steadying wheels 7 carried by the chassis 1 on suitable pivots 8 as shown in FIG. 3. The outer ends of the track elements 11 carry the substantially V-shaped end braces 14 which receive the steadying wheels 7 in the manner shown most clearly in FIG. 3. It is to be noted that instead of separate components 14 the ends of the track elements 11 may be given a suitable angled configuration to cooperate with the steadying wheels 7.

Figure 2:
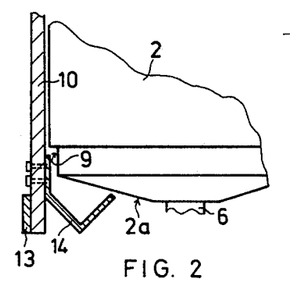
FIG. 2 is a fragmentary partly sectional view of the manner in which part of a track means goes around an end region of an end roll, FIG. 2 illustrating how a track means is braced on the end roll.

As is shown in FIG. 2, the components of the end roll means 2 may have outer tapered end surfaces 2a engaging the free ends of the angled members 14 for steadying the track means at its portions which at any given instant extend around the end roll means 2. In the case where these components 14 are separate elements the components of the end roll means 2 are formed at their outer end regions with circular notches or shoulders 9 for accommodating the components 14 as illustrated in FIG. 2.

As has been pointed out above, the central band 12 forms a length-limiting means which limits the extent to which the length of the endless track means 10 can increase at its central region. The length-limiting means also includes a pair of opposed endless bands 13 which are fixed to the outer ends of the track elements 11, these endless bands 13 being fixed to the ends of the track elements together with the components 14 by way of suitable bolts 15. Thus, each of the endless bands 13 is also made of a non-stretchable sheet material which however is flexible in the same way as the endless band 12. The endless bands 13 are each fixed to the transverse track elements 11 in the manner shown most clearly in FIG. 10a. Thus referring to FIG. 10a it will be seen that between successive track elements 11 which are situated between the end rolls 2 the band 13 has an outwardly bulging portion 13a. However, at the portions of the endless track means which at any given instant extend around the end roll means 2 the slack of the portions 13a is taken up so that these portions become tensioned to form the portions 13b shown in FIG. 10a. In this way the endless track means is stiffened at each portion which extends around one of the end roll means 2, providing from the track means a rigid entity with the end roll means 2 so tht there will be no slip with respect to the latter. As is apparent from FIGS. 1 and 2 the track elements 11 extend outwardly beyond the end extremities of each end roll means 2, and it is beyond the opposed extremities of each end roll means 2 that the band 13 is located at each side of the rack means 10. In this way the limiting bands 13 form a stiffening means for the endless track means 10 on the end rolls 2. Thus, the pair of bands 13 serve to brace the endless track means on the pair of opposed end roll means 2. Moreover the endless bands 13 are fastened to those surfaces of the track elements 11 which engage the road on which the vehicle travels so that the largest radius is provided for the bands 13 at their portions which exend around the axes of the end rolls 2. Thus when the vehicle executes a turn of relatively large radius the bands 13 will have the slack portions 13a while still maintaining the taut portions 13b.

Although the central band 12 may be made of any desired material which is substantially non-stretchable, it can have the construction of a steel band having laterally a rigidity greater than in the vertical direction so that it will curve uniformly as pointed out above. In the particular construction shown in FIG. 4 plates 16 are situated on the endless band 12 to press the latter against the track elements 11 by way of the fastening screw or bolts 17, so that these plates 16 will serve in this way to increase the lateral rigidity of the band 12 even if it should be made of an elongated non-stretchable sheet material which is in itself incapable of providng the required lateral rigidity. These rigid plates 16 may be made of sheet steel and have a width substantially equal to that of the track elements 11.

Figure 11A:
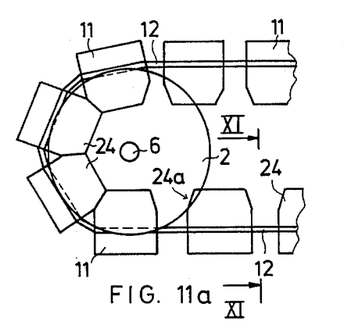
FIG. 11a is a fragmentary side elevation of another embodiment of an endless track means according to the invention having at its track elements configurations enabling the endless track means to assume a substantially rigid non-slip relationship with respect to each end roll means.
Figure 11B:
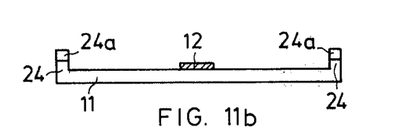
FIG. 11b is a transverse partly sectional elevation of one of the track elements of FIG. 11a, taken along line XI—XI of FIG. 11a in the direction of the arrows.
Figure 11C:
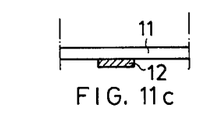
FIGS. 11c and 11d are respectively partly sectional fragmentary views of variations in the structure of the central region of FIG. 11b according to which the central band may have a different relationship with respect to the transverse track components.
Figure 11D:
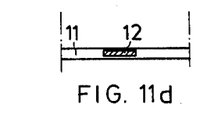

As may be seen from FIG. 11b, the central band 12 of the length-limiting means of the endless track means 10 may be fixed to the transversely extending track elements 11 at the inner surfaces thereof which are directed inwardly toward the space which is surrounded by the endless track means, these surfaces being opposed of those which engage the surface on which the vehicle travels. However, such an arrangement is not essential. Thus FIG. 11c shows an arrangement where the endless central band 12 is fixed to each of the track elements 11 at the outer surface thereof which engages the road on which the vehicle travels, and FIG. 11d shows an arrangement where the central band 12 is fixed to the elements 11 between the opposed faces thereof. The arrangement as shown in FIG. 11d may be provided in any suitable way such as by providing each track element 11 with a central notch for receiving the element 12 with this notch being closed by a suitable plate situated against the element 12. Also each of the elements 11 may be made of a pair of sheets of metal which are fastened to each other in any suitable way and which grip between them the central band 12 to provide in this way an arrangement as illustrated in FIG. 11d.

Figure 6:
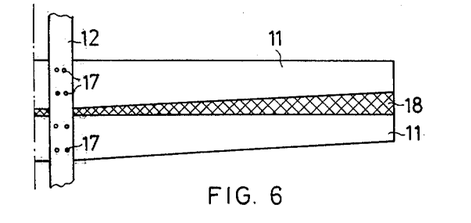
FIG. 6 is a fragmentary plan view of a central band and a pair of transversely extending track elements having a stretchable sheet material such as rubber or the like situated therebetween for eliminating the requirement of lateral length-limiting bands.
Figure 7:
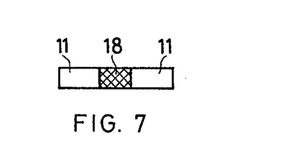
FIG. 7 is an end view of the structure of FIG. 6 as seen from the right of FIG. 6.

While the extent to which the endless band 12 can curve laterally will contribute to the uniformity of the curvature of the endless track means when executing a turn, this uniformity also can be enhanced by providing elastic filler bodies 18 as illustrated in FIGS. 6 and 7. Thus it will be seen that the tapered spaces defined between the successive track elements 11 are filled by elastic stretchable sheet material 18 bonded in any suitable way to the edges of the elements 11 and filling the gaps therebetween in the manner illustrated in FIGS. 6 and 7. Although the elements 18 are shown as extending along the entire space between the successive track elements 11, these filler bodies 18 may extend only over part of the space between successive track elements. The elastic filler bodies 18 may be made of rubber or the like and will automatically contract when the elements 11 approach each other at the inside of a turn while readily stretching at the spaces between the elements 11 on the outside of a turn. In this way these elastic bodies 18 will also contribute to the smoothness and uniformity in the curvature of the endless track means 10 when the latter executes turns.

Figures 9A, 9B:
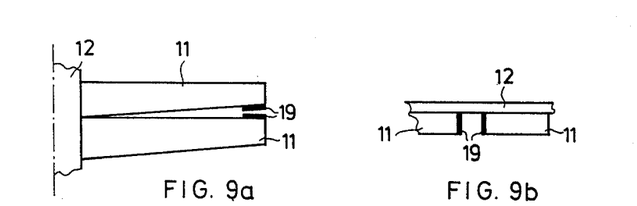

FIGS. 9a and 9b illustrate inserts 19 which may be situated at the spaces between successive track elements 11. These inserts 19 may be made of a relatively rigid or elastic material and are fastened in any suitable way to the edges of successive elements 11 as illustrated to occupy part of the space between the successive elements 11. Thus these elements 19 permit the elements 11 to move freely apart from each other along the outside of a curve while they will engage each other along the inside of a curve to contribute to the uniformity of the curvature of the track means when executing turns. While the elements 19 may be used by themselves, they also may be used in conjunction with the fillers 18 which in this case do not exted to that part of the space between successive elements 11 which is occupied by the inserts 19. The inserts 19 and/or bodies 18 may completely replace the length-limiting bends 13. Thus, instead of the elastic bodies 18 it is possible to use an endless elastic band of rubber or the like which encircles the side regions of the endless track means 10, such an endless elastic band being dimensioned so as to have a rigidity enabling it to act as a length-limiting band 13 for a side region of the endless track means 10 as well as a stiffener for the endless track means 10 on the end rolls 2 as described above.

The stiffening of the endless track means 10 on each of the end roll means 2 may also be carried out, for example, with an arrangement as shown in FIGS. 11a and 11b according to which each of the track elements 11 has at its opposed ends inwardly extending angled portions 24 each having front and rear inclined end surfaces 24a. Thus, at the lower run of the endless track means the angled portions 24 extend upwardly away from the surface on which the vehicle travels while at the upper run these angled portions extend downwardly toward the surface on which the vehicle travels, and at each of the end roll means 2 the angled portions 24 extend inwardly toward the axes of the end roll means 2, as is apparent from FIG. 11a. The spacing between the successive track elements 11 and the curvature of each of the end roll means 2 is such that the bevelled surfaces 24a engage and press against each other at each end portion of the endless track means 10 which at any given instant extends around an end roll means 2, as illustrated in FIG. 11a, and in this way the track means is rendered rigid to form an entity with the end roll means 2 which will not slip with respect thereto. A similar effect can be achieved by providing the end rolls 2 with radii at their end regions which engage the parts of the elements 11 which carry the length-limiting bands 13 which are larger than the radii of the end roll means 2 at the portions thereof which receive the central band 12. It will be seen that such an arrangement is indeed provided as illustrated in FIG. 1. In addition to the above arrangements for stiffening the endless track means 10 at its portions which at any given instant extend around the pair of end roll means 2 it is possible to provide structures where the end rolls 2 carry prongs or other projections which enter into the gaps between the elements 11 or the end rolls 2 may be provided with openings such as suitable holes or depressions to receive projections on the track elements 11. Arrangements of this latter type support the track means 10 on the end rolls 2 in a lateral direction and are of particular advantage when the power which propels the vehicle is transmitted to the track means 10 through one or both of the end rolls 2.

Figure 14:
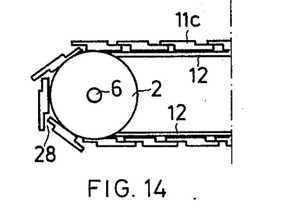
FIG. 14 is a schematic representation of an endless track means of the invention extending round and beyond an end roll means with this endless track means having overlapping transversely extending track components.

As shown in FIG. 14, the transverse track elements 11c are each provided with forwardly and rearwardly extending thinner and edge regions which overlap similar end edge regions of the immediately preceding and immediately following track element 11c. The spacing between the track elements 11c, determined by the manner in which they are fixed to the central band 12, is such that the end edge of one track element presses against the next track element as shown at 28 in FIG. 14, to achieve the desired rigidity on the end roll means 2 in this way.

Figures 10A, 10B:
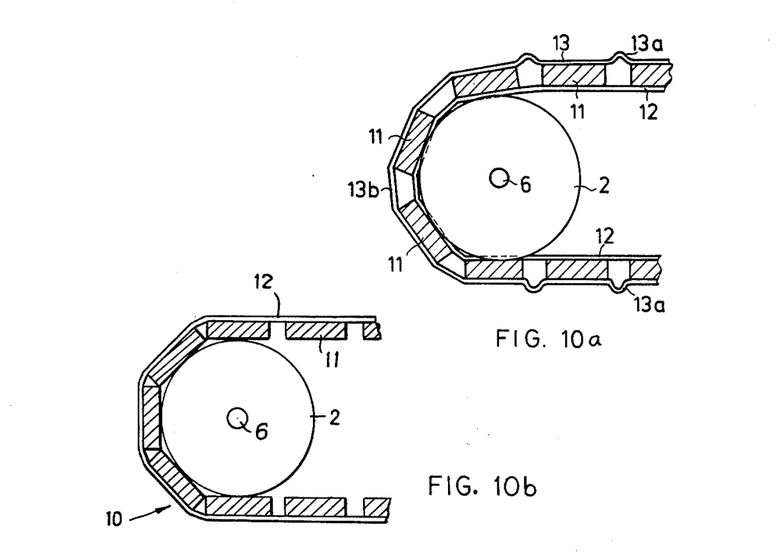
FIG. 10a is a schematic fragmentary longitudinal sectional elevation of an endless track means of the invention at the part thereof which extends around and beyond an end roll means with FIG. 10a illustrating in particular how a lateral length-limiting means operates at the region of the endless track which extends around an end roll as well as beyond the end roll.
FIG. 10b is a schematic side elevation of another embodiment of a structure for rendering the endless track means rigid with respect to the end rolls.

Also it is possible to provide an arrangement as shown in FIG. 10b where the central band 12 is fixed to the transverse elements 11 at the outer surfaces of the latter as illustrated. In this case the elements 11 are spaced from each other at distances which will cause the elements 11 to press directly against each other at the portions of the endless track means 10 which at any given instant extend around the end roll means 2, and in this way also the desired rigidity and non-slipping of the track means with respect to the end rolls is achieved.

Figure 8:
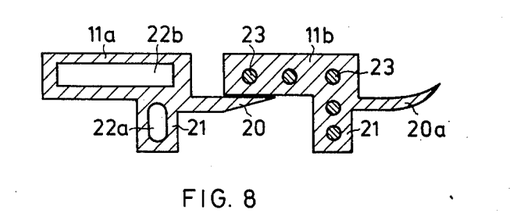
FIG. 8 is a longitudinal sectional elevation of a pair of successive track elements of a different construction.

FIG. 8 shows a construction where transverse track elements 11a alternate with transverse track elements 11b, although if desired the track means may be made up entirely of elements 11a or elements 11b. The outer portions of the elements 11a which engage the surface on which the vehicle travels are formed with the hollow internal cavities 22b which extend longitudinally of the elements 11a, transversely of the endless track means. Moreover, these elements 11a are formed with inwardly directed ribs 21 which are formed with the cavities 22a which extend together with the ribs 21 longitudinally of each track element 11a, transversely with respect to the endless track means and the direction of travel of the vehicle. Preferably these cavities 22a and 22b taper so that they are relatively narrow at the central region of the track means and become gradually wider toward the opposite side edge regions thereof.

The track element 11b has an exterior surface configuration which corresponds to that of the track element 11a. However the track element 11b is provided in its interior with elongated reinforcing rods or wires 23. Thus, these track elements 11a and 11b are made of a material such as rubber, and during vulcanizing thereof the reinforcements 23 are bonded to the rubber, being embedded therein as illustrated in FIG. 8. Thus, these reinforcements 23 extend longitudinally of each track element, in a direction which is transverse to the direction of travel of the vehicle. With an arrangement as shown in FIG. 8 the elements 11b will be more rigid than the elements 11a so that the latter form relatively weak portions which alternate with the relatively rigid portions 11b, providing in this way yielding of the track means at the alternate elements 11a. The elements 11a and 11b have the extensions 20 which extend from one track element into overlapping relation with respect to the next track element. As shown at 20a at the right of FIG. 8, when these parts are not stressed they are curved as illustrated. As a result when the track is assembled the elements 20 will press against the adjoining track element, and in this way an exceedingly effective operation is achieved with the successive track elements lending rigidity to the endless track means at its portions which extend around the end roll means 2.

Figure 12A:
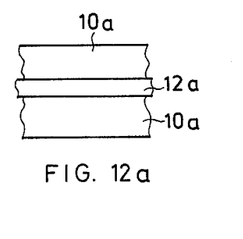
FIG. 12a is a fragmentary plan view of an endless track means having a central band fixed to an endless track structure in the form of a sheet of vulcanized rubber or other plastic by means of bolts, rivets, steel plates, or the like, which are not illustrated in FIG. 12a, while the endless band may also be fixed to the sheet which forms the endless track by being bonded thereto during vulcanizing or by being embedded therein during vulcanizing.
Figure 12B:
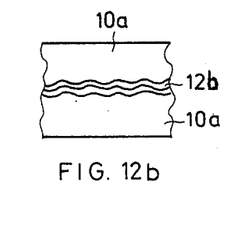
FIG. 12b schematically illustrates a central structure which does not take the form of an endless band but instead includes longitudinal bracing elements which prevent stretching and which are joined with the sheet material of the endless track during the vulcanizing process.

Instead of providing an endless track means 10 composed of the transversely extending elements 11, it is possible to construct the track means 10 from a continuous sheet material in the nature of a continuous endless mat or carpet, as illustrated in FIGS. 12a and 12b. Such a continuous sheet material 10a may be stretchable and contractable so as to automatically conform at the opposed side regions of the endless track means to the requirements encountered during turning of the vehicle as set forth above. However, as shown in FIG. 12a, the stretchable and contractable side regions are situated on opposed sides of a central elongated length-limiting means formed by the endless central band 12a which may be a steel band embedded directly in the rubber sheet material during vulcanizing of the latter, with the endless band 12a having a lateral rigidity substantially greater than its rigidity in a vertical direction to provide the uniform curvature referred to above. As is shown in FIG. 12b, instead of using a single elongated band 12a it is possible to render the central endless region of the track means substantially non-stretchable by embedding in the material thereof or otherwise fastening to the material of the endless track means a plurality of wire reinforcing components 12b which may be situated either beside each other or consecutively and which may take the form of corrugated stiffening inserts 12b which during the vulcanizing of the rubber which forms the continuous sheet material 10a is bonded or embedded in the material thereof.

Figure 13A:
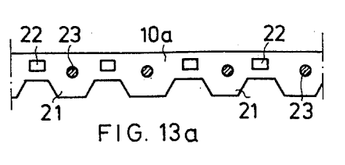
FIGS. 13a and 13b respectively illustrate schematically and fragmentarily parts of elongated endless track means which have alternating relatively weak and relatively rigid portions distributed along the endless track and extending transversely thereof with the relatively rigid portions having transversely extending stiffening elements so as to provide the track means with alternate stretchable and non-stretchable portions.
Figure 13B:
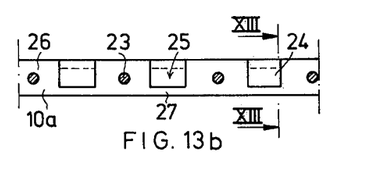
Figure 13C:
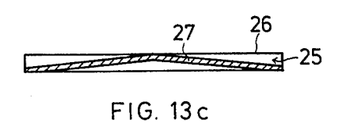
FIG. 13c is a schematic transverse section of the structure of FIG. 13b taken along line XIII—XIII of FIG. 13b in the direction of the arrows.

FIGS. 13a, 13b, and 13c illustrate a construction where the endless track means is also in the form of a continuous body of a sheet material 10a such as rubber. This sheet material 10a is constructed so as to have alternate relatively weak regions between which are located relatively rigid regions which do not yield to the same extent as the relatively weak regions. Thus according to FIG. 13a the sheet material which forms the endless track means 10a has relatively thick portions 21 which alternate with relatively thin portions provided with the transversely extending cavities 22, the relatively thick portions 21 having the transversely extending reinforcements 23 embedded therein. Thus the stretching and contracting will take place primarily at the relatively weak portions which are thinner and provided with the cavities 2 while the track means will remain relatively rigid at its thicker portions 21 provided with the reinforcements 23. These cavities 22 also are preferably formed in such a way that they become narrower toward the center of the track means, so that the cavities 22 are widest at the opposed outer side regions of the track means. In this way a desirable lateral elasticity of the endless track means 10a is achieved to promote the uniform turning referred to above.

With the arrangement shown in FIGS. 13b and 13c, the continuous sheet 10a of rubber or the like also has relatively thick portions 26 provided with the transversely extending reinforcements 23 respectively embedded therein as illustrated. Between these relatively thick portions 26 the track means 10a is formed with the transversely extending gaps 25 which are occupied by the relatively thin transversely extending strips of sheet material 27 (FIG. 13c) which are integral with the thicker portions 26 and which are curved as illustrated in FIG. 13c. Thus contraction and expansion during turning will take place at the thinner more yieldable or weaker portions 27 rather than at the more rigid portions 26. The reinforcements 23 may be bonded to the portions 26 during vulcanizing.

FIGS. 15–23 show part of an endless track means of the invention which is made up of a series of transversely extending sections 31 which are connected one to the next as described below. These elongated transversely extending track elements 31 have a substantially plate-like construction, and by joining them together at their end edges they can make up an endless track means according to the invention which is capable also of contracting and expanding at the opposed side regions to provide the uniform turning capability referred to above. These sections which form the track elements 31 are made of a suitable elastic and wear-resistant plastic material such as polypropylene or a synthetic rubber such as a butadiene rubber. Each of the sections 31 has a central substantially non-stretchable region 41 situated between the elongated transversely extending regions 32 which have a pleated, zigzag, substantially accordion-shaped configuration as shown most clearly in FIG. 20. Thus, these elongated side regions of each of the sections 31 are capable of elastically expanding and contracting at each side of the central substantially non-strethable region 41 in response to turning of the vehicle, while the endless track means is also capable of curving around the pair of opposed end roll means 2 during travel of the vehicle. Thus, the central regions 41 of the successive elements 31 form the central substantially non-stretchable length-limiting means which is capable of bending so as curve smoothly not only around the end rolls but also in accordance with the turning radius of the vehicle.

Figure 20:
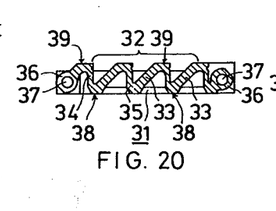
Figure 21:
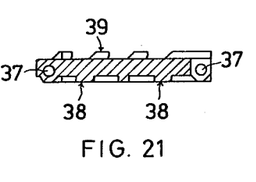
Figure 22:
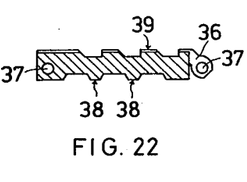
Figure 23:
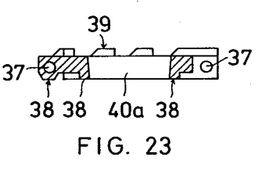
Figure 25:
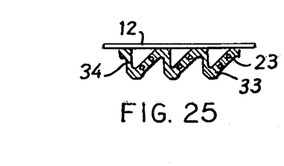
FIG. 25 is a fragmentary longitudinal sectional elevation of the track of FIG. 24 taken along line XXV—XXV of FIG. 24 in the direction of the arrows.

The accordion-like elongated side regions 32 of each section 31 is made up of alternating strip portions 33 and 34 which are integrally joined at their edges so as to form the accordion-like parts 32 which have the zigzag cross section illustrated most clearly in FIG. 20. The strip portions 33 and 34 are respectively fixed at their inner ends to the central region 41 by being formed integrally therewith. As is apparent from FIG. 20 the strip portions 34 extend substantially vertically at the upper and lower runs situated between the end rolls while the alternating strip portions 33 are inclined. Preferably the inclined strip portions 33 have a rigidity greater than the vertical portions 34. This can be brought about by embedding in the strip portions 33 suitable reinforcing wires or rods 23, as shown in FIG. 25. Thus the more flexible or weaker portions 34 are oriented so as to extend vertically as illustrated in FIG. 20. During expansion and contraction bending of the sections 31 will occur primarily at the junctions 35 where the alternating strip portions 34 and 33 are joined to each other. At these junctions the sections 31 are provided with planar surfaces 38 and 39. Thus the surfaces 38 are the outer surfaces which engage the surface on which the vehicle travels while the surfaces 39 form the inner surfaces directed toward the space which is surrounded by the endless track means. It will be noted from FIGS. 15 and 21–23 that the planar surfaces 38 extend across the central substantially non-stretchable region 41.

It is possible to situate in the spaces defined between the strip portions 33 and 34 projecting bodies which will act to limit the extent to which the side regions 32 can contract.

Along each of its opposed end edges each track element 31 is provided with the projections 36 which are formed with the bores 37 passing therethrough. An adjoining section 31 will have projections 36 received in the spaces between the projections 36 of the next element 31 as is apparent from the phantom line illustrated in FIG. 15. These elongated projections 36 may be fluted. Suitable pins which are not illustrated are placed in the lined bores 37 of the adjoining sections 31 to hingedly connect them to each other. In this way each section 31 can swing with respect to the next section so that the endless track means can pass around the end rolls 22. Of course, the attachment of the consecutive track elements may be provided in other ways.

Figure 15:
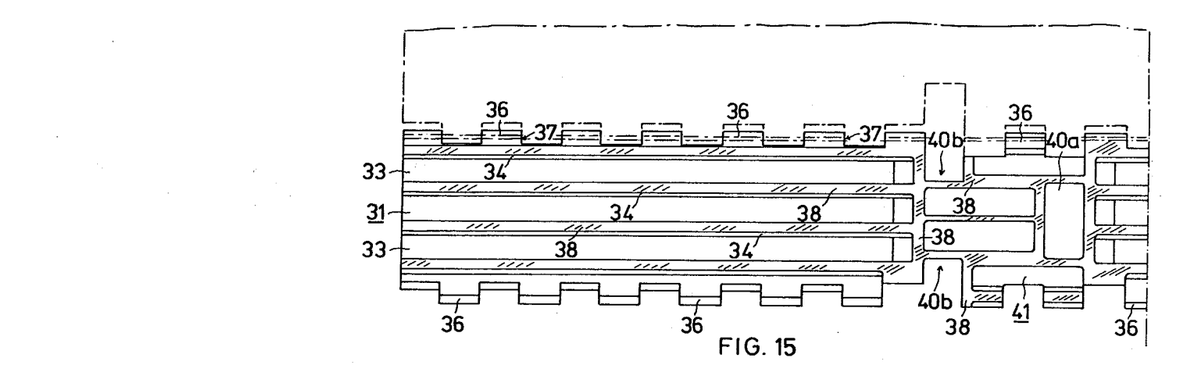
FIG. 15 is a plan view, as seen from the outside of the endless track means, of one of a number of transverse track sections, FIG. 15 illustrating the central region of the track section as well as a complete lateral region on one side of the central region and part of a lateral region on the other side of the central region with FIG. 15 showing in phantom lines an adjoining track section and illustrating the structure at the surface thereof which engages the road on which the vehicle travels.
Figure 16:
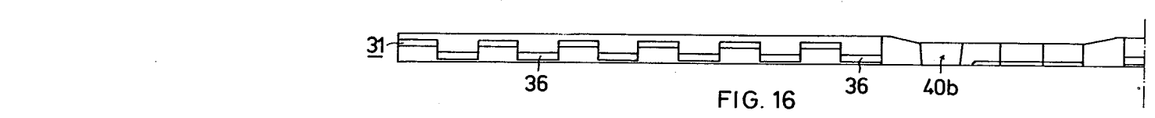
FIG. 16 is an elevation of the structure of FIG. 15.
Figure 17:
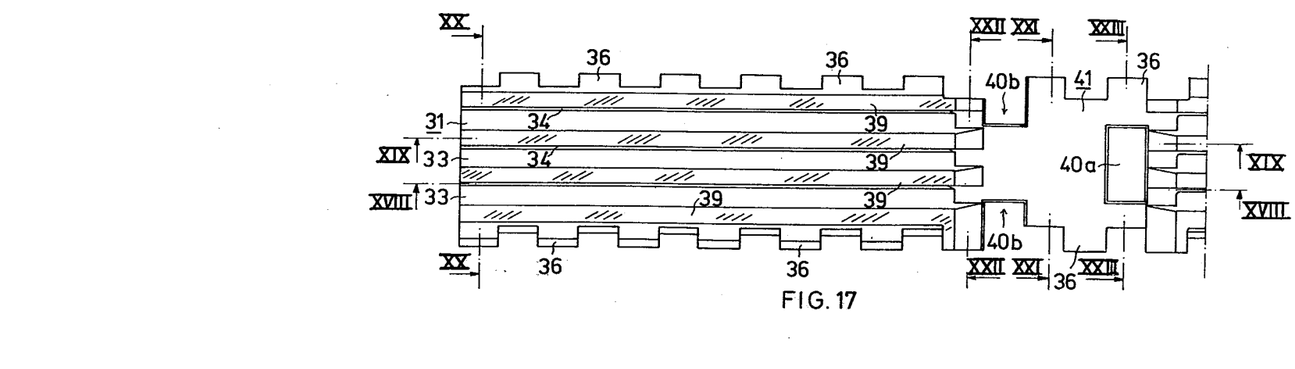
FIG. 17 shows the structure of FIGS. 15 and 16 as it appears from the inside of the track, at the surface thereof opposite to that which engages the ground and which is shown in FIG. 15.
Figure 18:
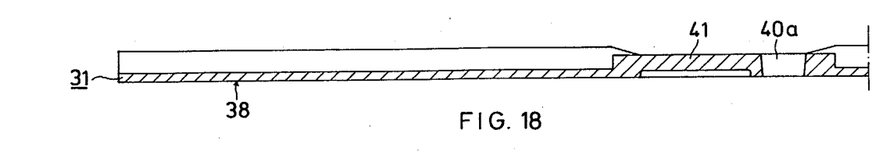
FIGS. 18–23 are respectively sectional elevations of different parts of the section shown in FIG. 17 respectively taken along line XVIII—XVIII, XIX—XIX, XX—XX, XXI—XXI, XXII—XXII, and XXIII—XXIII of FIG. 17 in the direction of the arrows.
Figure 19:
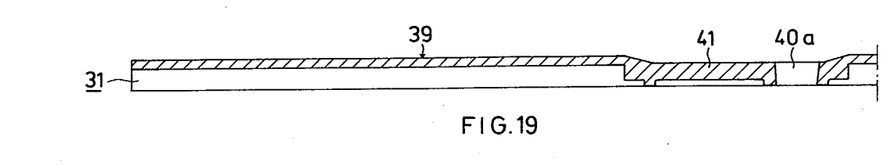

The central substantially non-stretchable region 41 of each element 31 is formed with an opening 40a of rectangular configuration passing therethrough. These openings 40a of the successive elements 31 will receive the teeth of steadying and/or traction sprocket wheels which are not illustrated and which are provided for the endless track means. Such sprocket wheels are provided with an additional row of teeth, and the additional row of teeth can be received in openings formed by notches 40b which extend into the opposed end edges laterally of the opening 40a as illustrated in FIGS. 15 and 17. The notches 40b of one section 31 will become aligned with the corresponding notches of the adjoining section 31 to define therewith elongated openings corresponding to the opening 40a but alternating therewith longitudinally of the endless track means, and thus the openings which are formed by the pairs of adjoining notches 40b will cooperate with the second row of teeth of the steadying and/or traction sprocket. Because of this arrangement there will always be one tooth from one of the rows of teeth or the other which will be firmly in engagement with the central region 41 of each element 31. A steadying wheel of the type referred to above may, for example, be a lateral steadying wheel for the endless track means.

Figure 24:
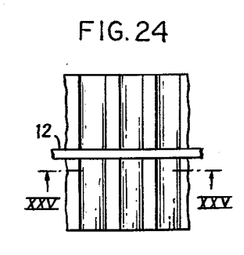
FIG. 24 is a fragmentary plan view of still another embodiment of an endless track means of the invention as seen from the inside of the track.

Of course, the specific details referred to above in connection with FIGS. 15-23 are not absolutely essential. For example, it is possible to make the endless track means of a continuous sheet material which has a zigzag accordion-shaped configuration as illustrated in FIGS. 24 and 25, this endless track means also being made of the same material as used for the sections 31. Such a continuous endless sheet material may be joined at its inner surface to a central endless band 12 which will form a length-limiting means. Thus the central band 12 is substantially non-stretchable to provide the same effect as the central regions 41 of the successive sections 31. A continuous endless track means as illustrated in FIGS. 24 and 25 is inexpensive to manufacture and requires only one joint where the ends of the sheet material are fused together. It is also possible to provide with such a construction at the opposed side regions additional length-limiting bands.

Because of the accordion-like configuration of the regions 32 as referred to above the endless track means of FIGS. 15-25 is of considerable advantage in that it is substantially more sensitive to expansions and contractions which take place in the plane of the endless track means than it is to bending and deformation in a direction which is perpendicular to this plane. It is possible to increase the transverse rigidity of this endless track means by providing various types of bracing bodies.

What is claimed is:

1. In a vehicle, endless elongated track means extending longitudinally in the general direction of the travel of the vehicle for assuming at either one of a pair of opposed side regions of the endless track means a contracted condition while assuming an expanded condition at the other side region when executing turns with the side region which contracts and the side region which expands being determined by the direction of turning and with said endless track means assuming in its entirely a curvature corresponding to the direction of turning of the vehicle, a pair of end roll means partially surrounded by and engaging said endless track means at opposed ends thereof for guiding said endless track means during travel of the vehicle with turns of the vehicle being brought about by turning of at least one of said end roll means about an upright axis, and length-limiting means forming part of said endless track means for limiting the arcuate lengths of those portions of said endless track means which at any given instant extend around said pair of end roll means for engaging said end roll means with portions of said endless track means which do not slip with respect to said end roll means and in effect form substantially rigid entities therewith, said track means assuming said contracted and expanded conditions with its own inherent structure, said length-limiting means including an elongated substantially non-stretchable endless band extending centrally along and fixed to said endless track means substantially midway between said opposed side regions thereof to provide said endless track means with taut arcuate portions extending around and engaging said end roll means, said non-stretchable band being flexible in a substantially vertical plane for conforming with the remainder of said endless track means to the curvature of said end roll means, said endless track means including transversely extending elongated track elements having central portions fixed to said band which forms said length-limiting means, said transversely extending track elements each having opposed elongated edge regions extending transversely of said track means and respectively overlapping preceding and following track elements and said overlapping track elements engaging each other at opposed edge regions thereof at the arcuate portions of said track means which at any given instant extend around said pair of end roll means for contributing to the rigidity of the endless track means at its portions which extend around the end roll means.

2. In a vehicle, endless elongated track means extending longitudinally in the general direction of the travel of the vehicle for assuming at either one of a pair of opposed side regions of the endless track means a contracted condition while assuming an expanded condition at the other side region when executing turns with the side region which contracts and the side region which expands being determined by the direction of turning and with said endless track means assuming in its entirety a curvature corresponding to the direction of turning of the vehicle, a pair of end roll means partially surrounded by and engaging said endless track means at opposed ends thereof for guiding said endless track means during travel of the vehicle with turns of the vehicle being brought about by turning of at least one of said end roll means about an upright axis, and length-limiting means forming part of said endless track means for limiting the arcuate lengths of those portions of said endless track means which at any given instant extend around said pair of end roll means for engaging said end roll means with portions of said endless track means which do not slip with respect to said end roll means and in effect form substantially rigid entities therewith, said track means assuming said contracted and expanded conditions with its own inherent structure, said length-limiting means including an elongated substantially non-stretchable endless band extending centrally along and fixed to said endless track means substantially midway between said opposed side regions thereof to provide said endless track means with taut arcuate portions extending around and engaging said end roll means, said non-stretchable band being flexible in a substantially vertical plane for conforming with the remainder of said endless track means to the curvature of said end roll means, said endless track means including a plurality of transversely extending elongated track elements each having a central region fixed to said band which forms said length-limiting means, said track elements being situated one next to the other along said band in a relatively closely-spaced relationship and said transversely extending track elements each terminating in a pair of opposed angled end regions extending upwardly away from a surface along which the vehicle travels, at a lower run of said endless track means, downwardly toward the surface along which the vehicle travels at an upper run of said endless track means, and inwardly toward axes of said pair of end roll means at those portions of said endless track means which at any given instant extend around said pair of end roll means, and said angled end regions of said track elements directly engaging each other at the end portions of said endless track means which at any given instant extend around said end roll means for contributing to the rigidity of the endless track means at its portions which extend around said end roll means.

3. In a vehicle, endless elongated track means extending longitudinally in the general direction of the travel of the vehicle for assuming at either one of a pair of opposed side regions of the endless track means a contracted condition while assuming an expanded condition at the other side region when executing turns with the side region which contracts and the side region which expands being determined by the direction of turning and with said endless track means assuming in its entirety a curvature corresponding to the direction of turning of the vehicle, a pair of end roll means partially surrounded by and engaging said endless track means at opposed ends thereof for guiding said endless track means during travel of the vehicle with turns of the vehicle being brought about by turning of at least one of said end roll means about an upright axis, and length-limiting means forming part of said endless track means for limiting the arcuate lengths of those portions of said endless track means which at any given instant extend around said pair of end roll means for engaging said end roll means with portions of said endless track means which do not slip with respect to said end roll means and in effect form substantially rigid entities therewith, said track means assuming said contracted and expanded conditions with its own inherent structure, said length-limiting means including an elongated substantially non-stretchable endless band extending centrally along and fixed to said endless track means substantially midway between said opposed side regions thereof to provide said endless track means with taut arcuate portions extending around and engaging said end roll means, said non-stretchable band being flexible in a substantially vertical plane for conforming with the remainder of said endless track means to the curvature of said end roll means, said endless track means including a plurality of transversely extending track elements distributed along said endless track means and each having a pair of opposed ends and a central region fixed to said band of said length-limiting means, said opposed ends of said track elements forming said opposed side regions of said endless track means and said length-limiting means including a pair of additional flexible, non-stretchable endless bands extending along said opposed side regions of said endless track means and respectively fixed to said opposed ends of said track elements for limiting the extent to which the ends of said track elements can move apart from each other at those portions of said endless track means which in any given instant extend around said end roll means.

4. The combination of claim 3 and wherein said additional bands respectively have lengths substantially equal to the length of said central band while said pair of end roll means each have opposed ends at the region of said additional bands which are of a larger radius than a central region of each end roll means where said central band is located.

5. In a vehicle, endless elongated track means extending longitudinally in the general direction of the travel of the vehicle for assuming at either one of a pair of opposed side regions of the endless track means a contracted condition while assuming an expanded condition at the other side region when executing turns with the side region which contracts and the side region which expands being determined by the direction of turning and with said endless track means assuming in its entirety a curvature corresponding to the direction of turning of the vehicle, a pair of end roll means partially surrounded by and engaging said endless track means at opposed ends thereof for guiding said endless track means during travel of the vehicle with turns of the vehicle being brought about by turning of at least one of said end roll means about an upright axis, and length-limiting means forming part of said endless track means for limiting the arcuate lengths of those portions of said endless track means which at any given instant extend around said pair of end roll means for engaging said end roll means with portions of said endless track means which do not slip with respect to said end roll means and in effect form substantially rigid entities therewith, said track means assuming said contracted and expanded conditions with its own inherent structure, said length-limiting means including an elongated substantially non-stretchable endless band extending centrally along and fixed to said endless track means substantially midway between said opposed side regions thereof to provide said endless track means with taut arcuate portions extending around and engaging said end roll means, said non-stretchable band being flexible in a substantially vertical plane for conforming with the remainder of said endless track means to the curvature of said end roll means, said endless track means including a plurality of discrete transversely extending track elements distributed along said endless track means in a relatively closely spaced relationship with each track element having a central region fixed to said band of said length-limiting means, said endless track means surrounding a given space and said transverse track elements respectively having inner surfaces directed toward said space and outer surfaces directed away from said space and said band of said length-limiting means being situated closer to said outer surfaces of said track elements than the inner surfaces of the latter for placing said track elements in engagement with each other at those portions of said endless track means which at any given instant extend around said pair of end roll means for contributing to the rigidity of said endless track means at its portions which extend around said pair of end roll means.

6. In a vehicle, a pair of end roll means extending transversely of the direction of travel of the vehicle and endless track means extending between and around said pair of end roll means to be guided thereby, said endless track means having a substantially non-stretchable central elongated endless region which is flexible and capable of assuming a curvature in accordance with turns which are executed by the vehicle when at least one of said end roll means turns about an upright axis, said endless track means having on each side of central elongated region thereof a lateral elongated endless region for automatically contracting when said lateral region is on the inside of a curve executed by the vehicle and expanding when the lateral region is on the outside of a curve executed by the vehicle, said lateral regions of said endless track means automatically expanding and contracting while said central region assumes a curved condition to cooperate with said central region for providing said endless track means with a smooth, substantially uniform curvature substantially throughout its length when the vehicle executes turns, said lateral elongated endless regions automatically expanding and contracting as a result of the structure of said endless track means itself, said endless track means including at said elongated endless central substantially non-stretchable region an elongated endless metal band and said endless track means including a plurality of transversely extending components distributed along said endless track means and each having a central region fixed to said band and a pair of opposed elongated regions which project laterally beyond said band and which gradually decrease in width away from said band so that said transverse track elements have opposed ends which are narrower than the central region of each transversely extending track element, and a plurality of elongated plastic filler bodies situated between the laterally extending portions of said track elements and bonded thereto for assuming a compressed condition at the inside of the track means and an expanded stretched condition at the outside of the track means when the vehicle executes a turn.

7. In a vehicle, a pair of end roll means extending transversely of the direction of travel of the vehicle and endless track means extending between and around said pair of end roll means to be guided thereby, said endless track means having a substantially non-stretchable central elongated endless region which is flexible and capable of assuming a curvature in accordance with turns which are executed by the vehicle when at least one of said end roll means turns about an upright axis, said endless track means having on each side of said central elongated region thereof a lateral elongated endless region for automatically contracting when said lateral region is on the inside of a curve executed by the vehicle and expanding when the lateral region is on the outside of a curve executed by the vehicle, said lateral regions of said endless track means automatically expanding and contracting while said central region assumes a curved condition to cooperate with said central region for providing said endless track means with a smooth, substantially uniform curvature substantially throughout its length when the vehicle executes turns, said lateral elongated endless regions automatically expanding and contracting as a result of the structure of said endless track means itself, each lateral region of said endless track means on each side of said elongated endless central region thereof having relatively weak portions spaced uniformly along said endless track means for yielding during expansion and contraction of said lateral regions, and said relatively weak portions being separated from each other by relatively rigid portions of each lateral region which are situated between said relatively weak portions thereof, said relatively weak portions including portions of said track means which are formed with cavities extending transversely of said track means.

8. In a vehicle, a pair of end roll means extending transversely of the direction of travel of the vehicle and endless track means extending between and around said pair of end roll means to be guided thereby, said endless track means having a substantially non-stretchable central elongated endless region which is flexible and capable of assuming a curvature in accordance with turns which are executed by the vehicle when at least one of said end roll means turns about an upright axis, said endless track means having on each side of said central elongated region thereof a lateral elongated endless region for automatically contracting when said lateral region is on the inside of a curve executed by the vehicle and expanding when the lateral region is on the outside of a curve executed by the vehicle, said lateral regions of said endless track means automatically expanding and contracting while said central region assumes a curved condition to cooperate with said central region for providing said endless track means with a smooth, substantially uniform curvature substantially throughout its length when the vehicle executes turns, said lateral elongated endless regions automatically expanding and contracting as a result of the structure of said endless track means itself, each lateral region of said endless track means on each side of said elongated endless central region thereof having relatively weak portions spaced uniformly along said endless track means for yielding during expansion and contraction of said lateral regions, and said relatively weak portions being separated from each other by relatively rigid portions of each lateral region which are situated between said relatively weak portions thereof, said relatively weak portions including portions of said track means which have a lesser thickness than said relatively rigid portions.

9. In a vehicle a pair of end roll means extending transversely of the direction of travel of the vehicle and endless track means extending between and around said pair of end roll means to be guided thereby, said endless track means having a substantially non-stretchable central elongated endless region which is flexible and capable of assuming a curvature in accordance with turns which are executed by the vehicle when at least one of said end roll means turns about an upright axis, said endless track means having on each side of said central elongated region thereof a lateral elongated endless region for automatically contracting when said lateral region is on the inside of a curvve executed by the vehicle and expanding when the lateral region is on the outside of a curve executed by the vehicle, said lateral regions of said endless track means automatically expanding and contracting while said central region assumes a curved condition to cooperate with said central region for providing said endless track means with a smooth, substantially uniform curvature substantially throughout its length when the vehicle executes turns, said lateral elongated endless regions automatically expanding and contracting as a result of the structure of said endless track means itself, each lateral region of said endless track means on each side of said elongated endless central region thereof having relatively weak portions spaced uniformly along said endless track means for yielding during expansion and contraction of said lateral regions, and said relatively weak portions being separated from each other by relatively rigid portions of each lateral region which are situated between said relatively weak portions thereof, said endless track means including at its central region a substantially non-stretchable central band and on each side thereof continuous plastic sheet material of pleated accordion-shaped configuration.

* * * * *